March 18, 1924.                    1,487,000
P. Q. WILLIAMS
CONVEYING MECHANISM
Filed Nov. 21, 1921          7 Sheets-Sheet 1

INVENTOR
PERCY Q. WILLIAMS
BY J. F. Rule
HIS ATTORNEY

March 18, 1924.

P. Q. WILLIAMS

CONVEYING MECHANISM

Filed Nov. 21, 1921

INVENTOR
PERCY Q. WILLIAMS
BY J. F. Rule
HIS ATTORNEY

March 18, 1924.

P. Q. WILLIAMS 1,487,000

CONVEYING MECHANISM

Filed Nov. 21, 1921

INVENTOR
PERCY Q. WILLIAMS
BY J. F. Rule
HIS ATTORNEY

March 18, 1924.

P. Q. WILLIAMS

CONVEYING MECHANISM

Filed Nov. 21, 1921

INVENTOR
PERCY Q. WILLIAMS
BY J. F. Rule.
HIS ATTORNEY

March 18, 1924.

P. Q. WILLIAMS

1,487,000

CONVEYING MECHANISM

Filed Nov. 21, 1921

INVENTOR
PERCY Q. WILLIAMS
BY J. F. Rule.
HIS ATTORNEY

Patented Mar. 18, 1924.

1,487,000

UNITED STATES PATENT OFFICE.

PERCY Q. WILLIAMS, OF CINCINNATI, OHIO.

CONVEYING MECHANISM.

Application filed November 21, 1921. Serial No. 516,518.

*To all whom it may concern:*

Be it known that I, PERCY Q. WILLIAMS, a citizen of the United States, residing at Cincinnati, in the county of Hamilton and State of Ohio, have invented new and useful Improvements in Conveying Mechanism, of which the following is a specification.

My invention relates to apparatus for receiving glassware such as bottles, jars, etcetera, and transferring them to a leer and placing them in position on the leer conveyor. An object of the invention is to provide an apparatus of the character indicated, which shall be efficient and reliable in operation, which has provision for preventing the soft plastic bottles or other articles from being broken or becoming distorted in shape during the transfer, which provides for improved means for distributing the ware on the leer conveyor, and which overcomes various defects common to conveyors in general use at the present time.

Other features of the invention and the precise nature thereof will appear hereinafter.

An endless conveyor 20 of asbestos composition or other material adapted to withstand high temperatures, is mounted to run continuously on rolls 21 and 22. These rolls are mounted adjacent the ends of a supporting frame comprising channel bars 23. The upper lead of the belt 20 is supported on rolls 24 arranged at intervals along the supporting frame. The lower lead of the belt is in like manner supported by rolls 25 journalled in brackets 26 secured to and depending from the frame members 23.

The tension of the belt 20 may be adjusted by a take-up device (see Fig. 12) comprising an adjusting rod 27 operated by a handle 28, said rod being journalled in the end of the conveyor frame and having a screw threaded connection with a bracket 29 slidably mounted on the conveyor frame and carrying the conveyor pulley 21. The conveyor is driven by an electric motor 31 connected through a silent chain 32 to a sprocket on the shaft of the pulley 21.

The conveyor frame is supported on trucks 33 and 34 arranged to run on tracks 35, permitting the apparatus to be readily moved bodily toward and from the leer 36.

Figures 3, 4:
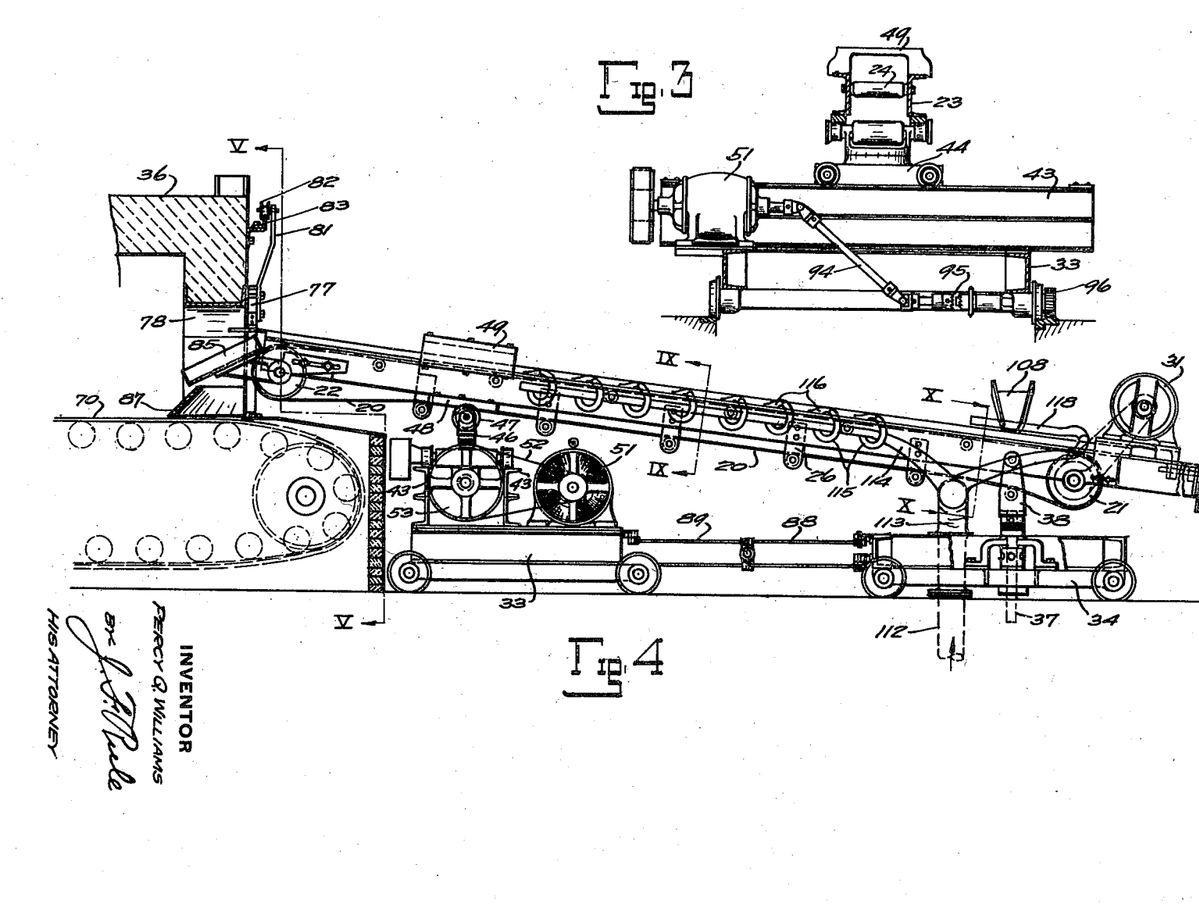
Figure 3 is a sectional elevation showing a truck and a conveyor supporting carriage mounted thereon.
Figure 4 is a part sectional side elevation of the conveyor apparatus and the adjacent end of the leer.

The outer or rear end of the conveyor has a swivel connection with its supporting truck 34, permitting the forward end of the conveyor to oscillate transversely across the end of the leer for distributing the ware on the leer conveyor. This swivel connection comprises a vertical non-rotating shaft 37 (see Figs. 4 and 10) mounted on the truck 34. A yoke 38 is swiveled on the upper end of the shaft 37, the upper ends of the yoke arms being bolted to the channel bars 23. A screw threaded sleeve 39 on a threaded portion of the rod 37 is provided with holes 41 to receive an operating tool by which said sleeve may be rotated to thereby move the rod 37 up or down. Said rod carries a collar 42 on which the yoke 38 is supported, so that the adjustment of the rod will move the outer end of the conveyor frame up or down to any desired position of adjustment.

Mounted on the forward truck 33 is a frame 43 extending transversely of the conveyor, and providing rails on which run the wheels 45 of a carriage 44. This carriage supports the forward end of the conveyor frame. The connections between the carriage and conveyor frame comprise a yoke 46 having a pivotal mounting on the carriage 44 for oscillation about a vertical axis. The yoke 46 carries rolls 47 which support rails 48 bolted to the channel bars 23. A yoke 49 bolted to the channel bars 23 is spaced a sufficient distance above the conveyor belt 20 to allow the passage of the ware on the conveyor.

The carriage 44 is driven by a motor 51 connected through a belt 52 to a pulley 53 on a rod 54 journalled in the ends of the frame 43. The rod 54 is screw threaded throughout the greater portion of its length and has a driving connection with a correspondingly threaded sleeve or block 55 on the carriage 44. The motor 51 is periodically reversed. As it rotates in one direction, the carriage 44 is advanced, thereby swinging the inner end of the conveyor across the leer. As it reaches the end of its travel, a switch S is operated to reverse the motor and cause the conveyor to travel in the opposite direction across the leer. The switch S comprises a U-shaped frame having an arm 56 carrying contacts a, b and c, and an arm 57 carrying contacts d, e and f. This frame is mounted to swing about a pivot 58 to move the switch arms alternatively to closed position. The switch is held in either position by means of a spring 59 which draws downward an arm 61 pivoted at 62 and carrying a roll 63 to engage the opposite faces of the wedge-shaped cam 64 carried by the swinging frame. When the carriage 44 reaches the limit of its travel in one direction, the roll 65 on the switch frame engages a stationary cam 66 which reverses the switch and causes the carriage 44 to travel in the opposite direction until it is again reversed by a roll 67 on the switch engaging a stationary cam 68.

Figure 18:
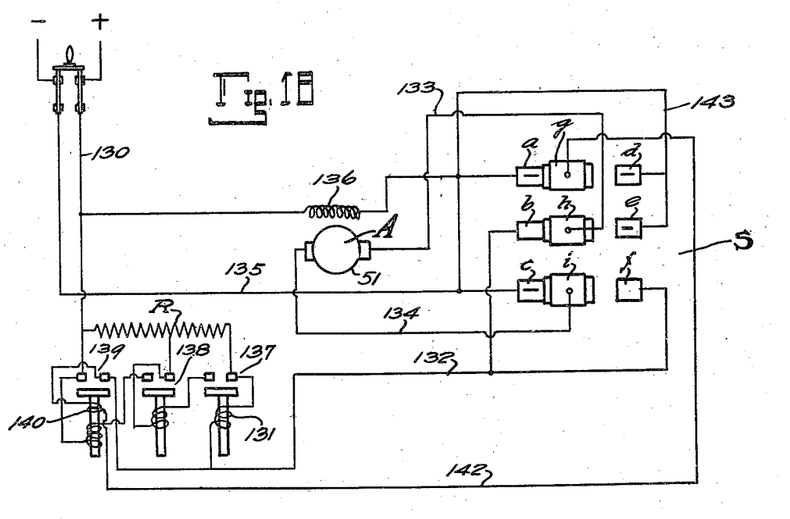
Figure 18 illustrates diagrammatically the circuits for the carriage driving motor and the reversing switch.
Figure 19:
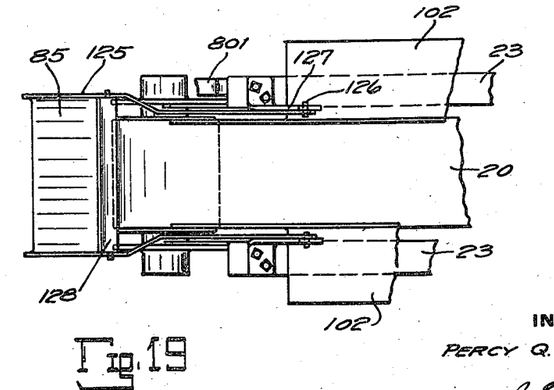
Figure 19 is a plan view of the mechanism shown in Figure 13.

Referring to Figure 18, which illustrates diagrammatically the circuits for the motor 51 and the reversing switch S. When the contacts a, b and c are closed, a circuit for the motor may be traced from the positive main through conductor 130, resistance of the rheostat R, coil 131, conductor 132, contacts b, h, conductor 133, armature A, conductor 134, contacts i and c, and conductor 135 to the negative main. The motor field winding 136 may be connected across the mains through conductors 130 and 135. The rheostat R may operate in the usual way to short circuit the resistance by successively closing the switches 137, 138 and 139. The switch 139 is held closed by its magnet coil 140. The circuit for this coil may be traced from the positive main through conductor 130, switch 139, coil 140, conductor 142, contacts g and a, and conductor 135 to the negative main. When the switch S is reversed, the armature circuit may be traced through conductor 130, resistance R, coil 131, conductor 132, contacts f and i, conductor 134, armature A, conductor 133, contacts h and e, and conductors 143 and 135 to the negative main.

Within the leer 36 is a leer conveyor 70, which may be of usual construction. After a row of bottles or other articles has been placed on the leer conveyor, it is advanced a short distance by a motor 71 connected thereto through gearing 72. The circuit for the motor 71 is automatically closed by a switch contact 73 on the nut 55, which contact engages stationary contacts 75 and 76 in the motor circuit. The motor 71 is automatically stopped after advancing the leer conveyor a step, in a manner well known in the art.

Figure 5:
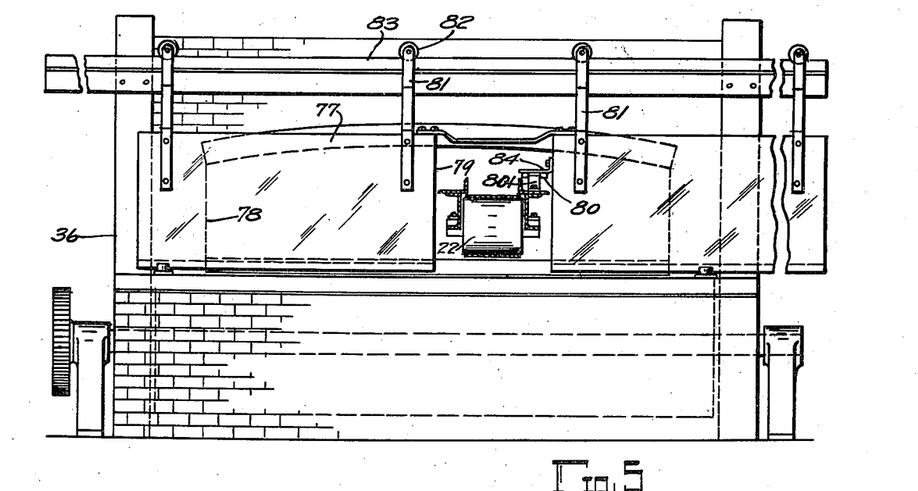
Figure 5 is a section on the line V—V on Figure 4.

A sliding door or closure plate 77 is arranged in front of the opening 78 at the front of the leer, said door being made in sections spaced to provide an opening 79 which permits the transfer of ware from the conveyor 20 to the leer conveyor. This sliding door is hung by means of rods 81 and rolls 82 to travel on a rail 83. A bracket 84 (Figs. 5 and 13) carries rolls 80 between which is a bar 801 on the conveyor frame, thus connecting the door to move across the leer with the conveyor frame.

The bottles or other articles as they are delivered from the conveyor 20, slide down a chute 85. The chute is carried by arms 125 connected at their upper ends by pivots 126 to brackets 127, the latter being provided with a series of holes to permit adjustment of the pivot points. The brackets are carried by the conveyor frame. A roller 128 is journalled at its ends in the arms 125, at the upper edge of the floor of the chute 85, and bridges the space between said floor and the conveyor 20. The main purpose of this roller is to permit the easy escape of any pieces of broken glass or the like without cutting or injuring the conveyor. Without such roller there is liability of pieces of broken bottles, etc., wedging between the conveyor belt and the floor of the chute and cutting the conveyor or otherwise injuring the mechanism. The lower end of the chute as it travels across the leer is directly over a stationary arc-shaped guide or retaining wall 87. This guide or retaining wall makes its possible to heap bottles and preclude the bottles from rolling toward the opening 78 in the front of the leer, and consequently it functions as a stacking means that will not damage the bottles although a number of bottles may roll from the top of the heap into the small depression in the heap of the ware that results from movement of leer conveyor 70.

Figures 12, 13:
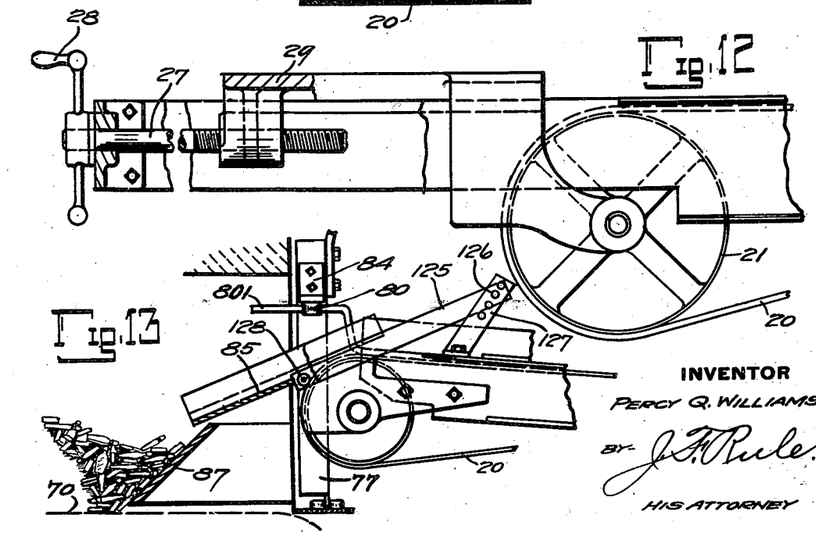
Figure 12 is a fragmentary view showing the outer end of the conveyor and the means for adjusting the tension of the conveyor belt.
Figure 13 is a view showing the inner end of the conveyor belt and the means for conveying the ware therefrom onto the leer conveyor.
Figure 14:
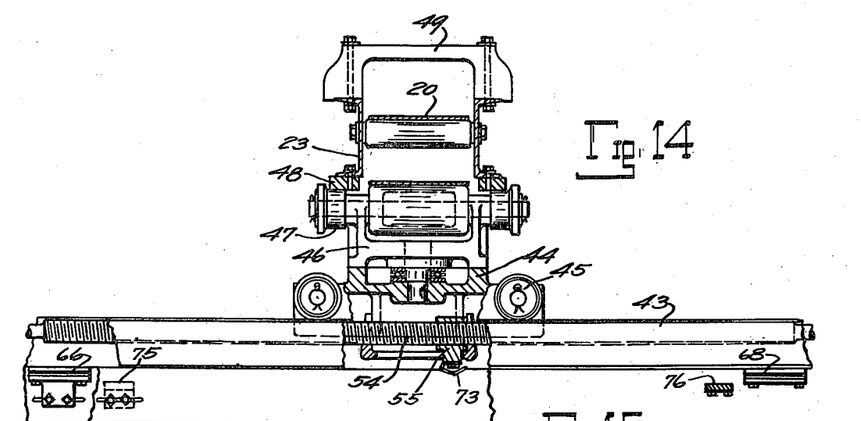
Figure 14 is a part sectional elevation of the carriage which supports the forward end of the conveyor, and the means for driving the carriage.
Figures 15, 16, 17:
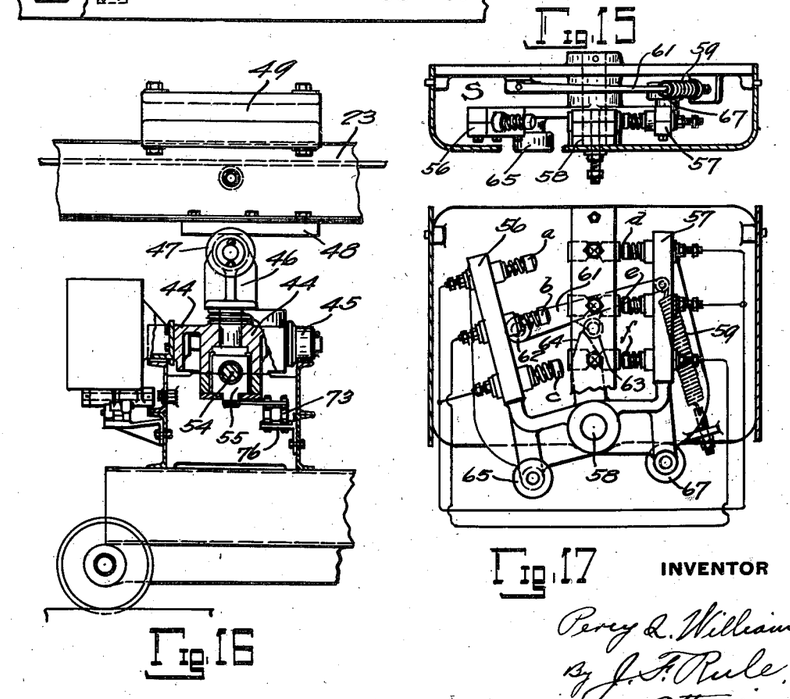
Figure 15 is a plan view of an electric switch.
Figure 16 is a fragmentary part sectional elevation of mechanism shown in Figure 14, but viewed in a direction at right angles to that of Figure 14.
Figure 17 is an elevation of the switch shown in Figure 14.

The bottles or other articles as they are discharged from the chute are stacked up or heaped on the leer 70, sometimes to a considerable depth, as shown in Figure 13. As the leer conveyor advances, carrying the bottles forward, a sort of pocket or depression is formed in the pile of bottles adjacent the guide 87. This pocket is then filled by by the fresh supply of bottles discharging from the chute. The piling up of the bottles in the manner indicated greatly increases the capacity of the leer, and also results in a great saving of fuel, owing to the transmission of heat from one bottle to another.

Figures 1, 2:
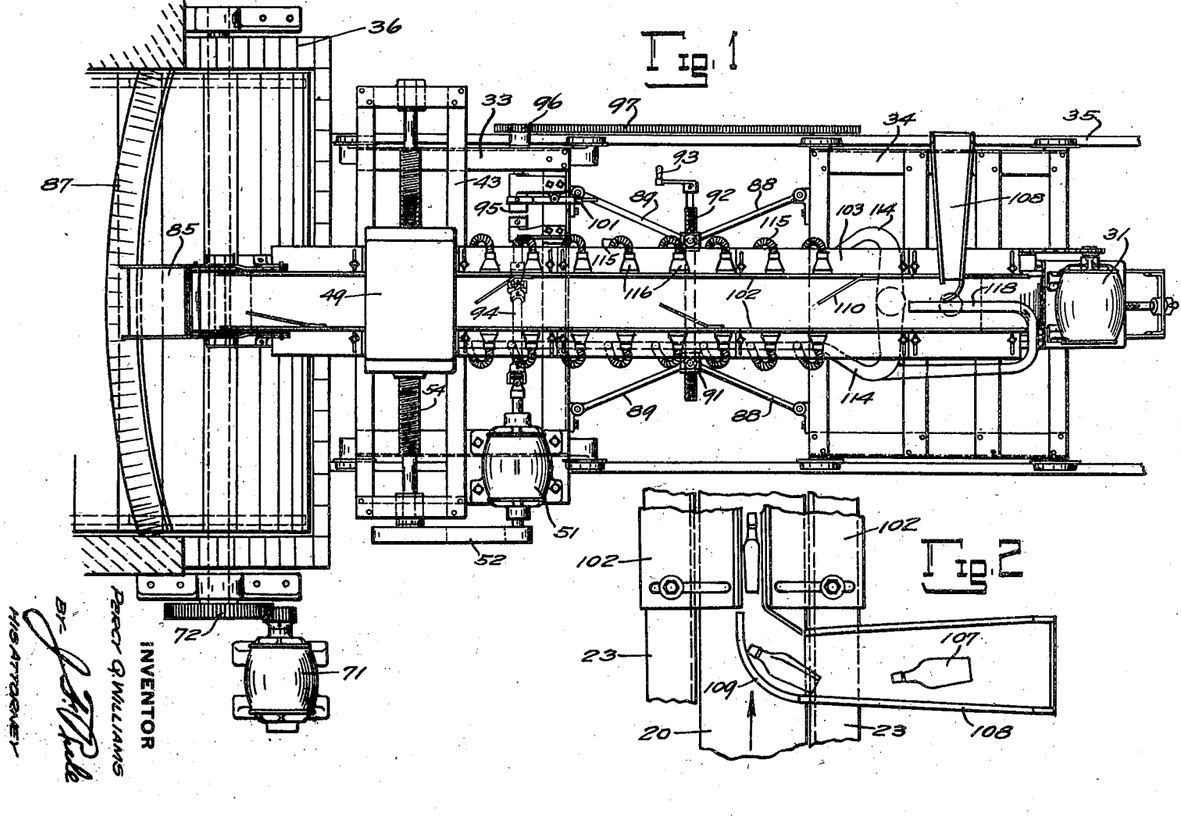
Figure 1 is a plan view of an apparatus constructed in accordance with my invention.
Figure 2 is a fragmentary plan view showing means for directing bottles onto the conveyor and turning them up on their narrow sides or edges.

The forward end of the conveyor frame may be adjusted up or down by moving the truck 33 toward or from the truck 34, thereby moving rolls 47 along the inclined track 48. Such adjustment is effected by means of toggle links 88 and 89 connected respectively to the trucks 34 and 33, the adjacent ends of the said links being connected to sleeves or nuts 91 on a right and left hand screw rod 92 operated by a hand crank 93. The motor 51 may be used to move the conveyor frame toward or from the leer. For this purpose it is connected through a driving rod 94 (see Figs. 1 and 3) and a clutch 95 to a pinion 96 running on a stationary rack 97. The clutch is operated by a hand lever 101.

Extending lengthwise of the conveyor 20 above the upper lead thereof are side walls 102 which are formed by the vertical flanges of angle bars 103 bolted to the frame members 23 by bolts 104 extending through slots 105 on said angle bars. The walls 102 may be provided with a facing 106 of asbestos or other material which will not injure the articles which are being conveyed.

The bottles 107 or other glass articles are delivered to an inclined chute 108 down which they slide by gravity, neck end first, onto the conveyor. At the lower end of the chute is a curved wall 109 (Fig. 2) by which the bottles are guided and turned to extend in the direction of the conveyor. Panel bottles or bottles of greater width than thickness, such as shown in the drawings, are automatically turned up on edge or on their narrow sides as they pass from the chute 108 onto the conveyor. That is to say, the bottles as they move along the curved wall 109 have their edges which are farthest from the wall thrown upward. This is apparently due to the combined action of momentum and the movement of the conveyor. The side walls 102 may be adjusted to the Figure 7 position, thereby providing a comparatively narrow channel along which the bottles are conveyed in single file, said walls preventing the bottles from tipping over.

This arrangement for turning the bottles up on their narrow sides or edges and maintaining them in such position is a feature of practical importance. The bottles when discharged onto the conveyor are sometimes sufficiently hot and plastic to permit the upper side of the bottle to sag downward under its weight, thereby distorting the bottle and reducing its capacity. This is particularly true of panel ware. By turning the bottles on edge, such distortion is prevented.

Figure 9:
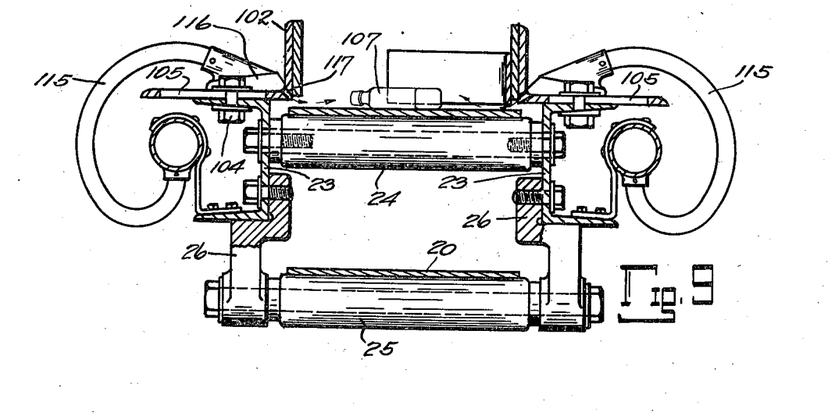
Figure 9 is a section at the line IX—IX on Figure 4.
Figure 10:
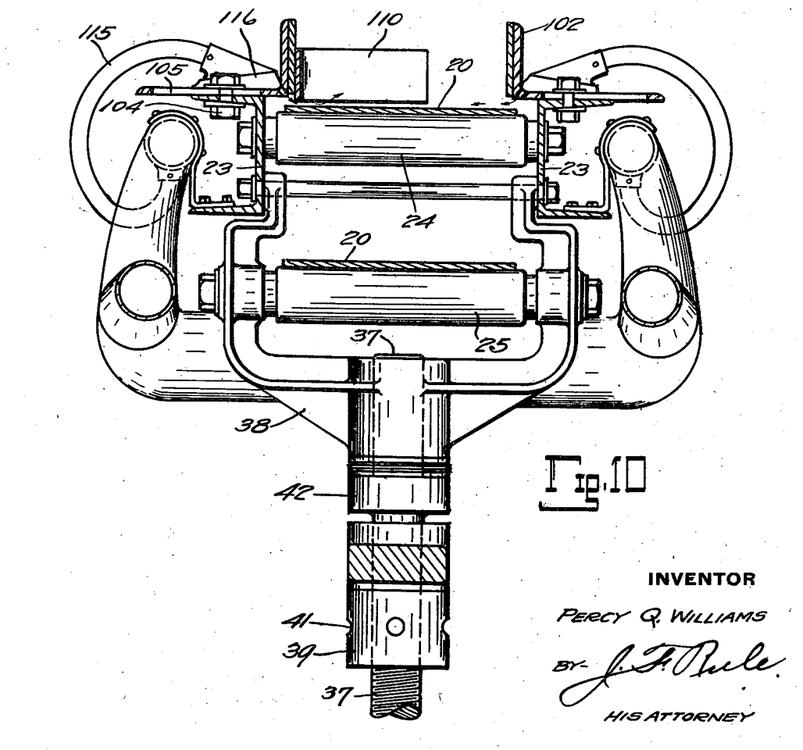
Figure 10 is a section at the line X—X on Figure 4.
Figure 11:
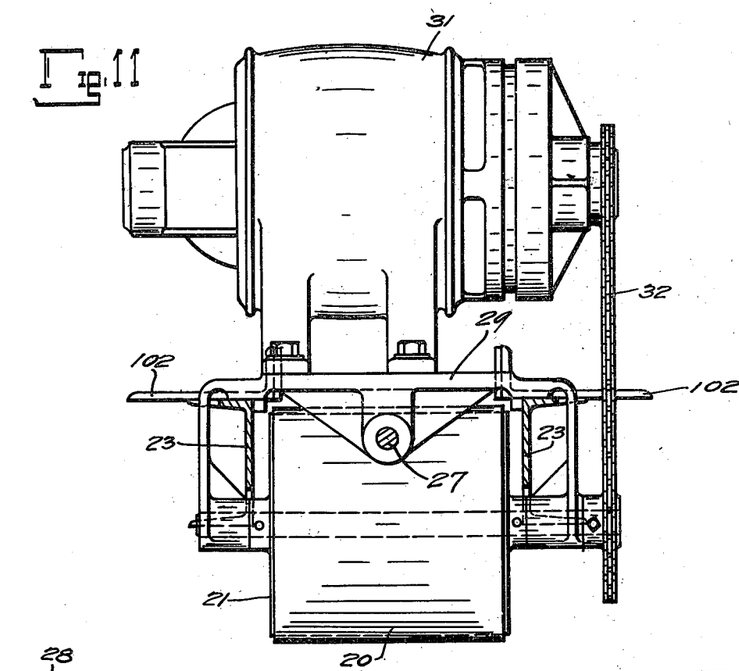
Figure 11 is a view showing a motor for driving the conveyor.

With many kinds of ware it is desirable to adjust the side walls 102 a considerable distance apart, as indicated in Figures 9 and 10. To prevent the bottles from sticking to the conveyor, or remaining too long in one position on the conveyor, baffle plates or deflectors 110 may be arranged at intervals along the conveyor walls.

It is sometimes desirable to provide means for cooling the ware during its passage to the leer, and for this purpose I have provided a pipe 112 connected with any suitable source of air pressure. The air is conveyed through a section 113 made of canvas or other flexible material, to branch pipes 114 which extend lengthwise of the conveyor frame. At intervals along the pipes 114 are laterals 115 through which the air is supplied to blowing heads or nozzles 116. The air from these heads is directed through perforations 117 against the articles on the conveyor. An additional branch pipe 118 (see Figs. 1 and 4) may be provided to direct a blast of air lengthwise of the conveyor.

Figures 6, 7, 8:
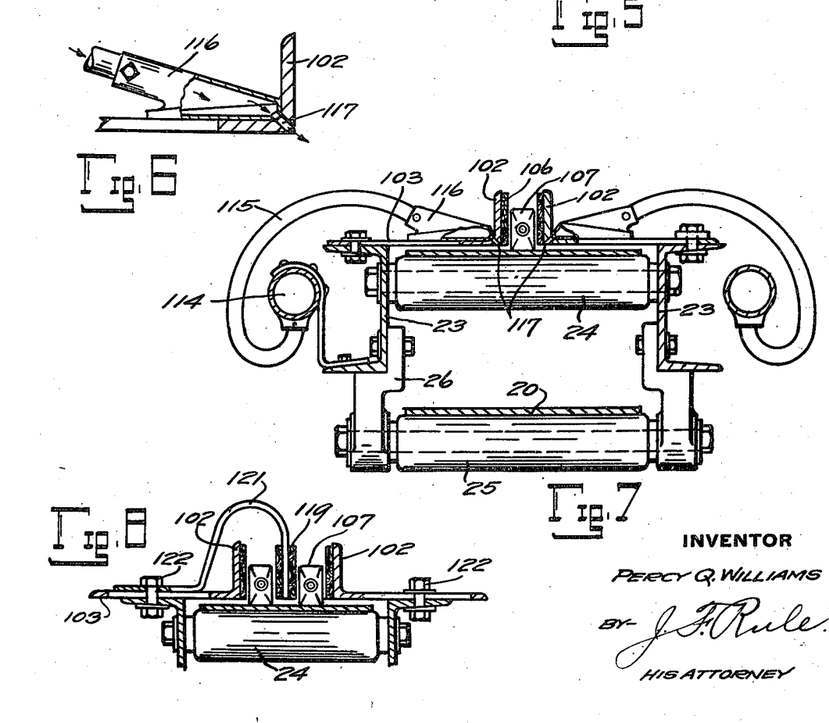
Figure 6 is a detail showing a blowing head, from which air is directed onto the articles on the conveyor.
Figure 7 is a cross-section at the line IX—IX on Figure 4, the side walls being adjusted to form a narrow channel for the bottles.
Figure 8 is a fragmentary view showing a conveyor with a central guide providing two channels for the bottles or other ware.

Figure 8 illustrates an arrangement by which a number of parallel channels may be provided. For this purpose a dividing wall 119 is carried on supporting rods 121 adjustably secured to the angle bars 103 by bolts 122. It will be understood that any desired number of partitions or walls 119 may be carried by the rods 121, depending on the number of channels desired.

Modifications may be resorted to within the spirit and scope of my invention.

What I claim is:

1. In a device of the class described the combination with a leer of an endless conveyor exterior of the leer, a frame on which said conveyor is supported, said frame mounted to swing about a vertical axis adjacent one end thereof, means to oscillate said frame horizontally about said axis, and means to adjust one end of said frame vertically and thereby vary the inclination of said conveyor.

2. The combination of an endless conveyor, a frame on which said conveyor is supported, said frame mounted to swing about a vertical axis adjacent one end thereof, a carriage on which the opposite end of the conveyor is supported, stationary tracks on which said carriage is mounted to travel in a direction transverse to that of the conveyor, and a connection between said carriage and conveyor frame permitting relative movement of said carriage and frame in a direction lengthwise of the frame to compensate for variations in the distance between said carriage and said vertical axis as said carriage travels.

3. The combination of a conveyor frame, trucks on which said frame is mounted, and means for adjusting said trucks toward and from each other, said trucks and frame having a roll and an inclined track moved relatively to one another during said adjustment to vary the inclination of the said frame.

4. The combination of an endless conveyor, a conveyor frame, trucks on which said frame is mounted, means including a motor for oscillating said frame about a vertical axis, and means to effect a driving connection between the motor and said trucks.

5. The combination of a leer, an endless conveyor, a frame on which said conveyor is mounted, said frame mounted to swing about a vertical axis remote from the leer and thereby swing one end of the conveyor and frame transversely of the leer, a guide along which articles are carried from the conveyor into the leer, and an arc-shaped stationary retaining wall within the leer for retaining said articles in a heap and along which said guide moves during said transverse movement of the conveyor.

6. The combination of a leer, a belt conveyor extending to the leer, a frame on which said conveyor is mounted, means to swing said frame and move the end of the conveyor back and forth across the end of the leer, an inclined wall extending across the leer beneath said conveyor, an endless conveyor within the leer, means to feed articles to said belt conveyor, and means to drive the latter and cause the articles to be piled up on the leer conveyor, said inclined wall being positioned to retain the articles in a heap as they are piled on the leer conveyor.

7. The combination of a leer, a leer conveyor, an endless belt conveyor, a frame on which the latter is mounted, said frame mounted to swing about a vertical axis remote from the leer and thereby swing one end of the belt conveyor transversely of the leer, a chute by which articles are guided from the belt conveyor to the leer, said chute carried with said frame, an arc-shaped inclined wall extending across the end of the leer beneath said chute and in position to retain articles in a heap as they are discharged from the chute and stacked up on the leer conveyor, and means to convey articles to the belt conveyor.

8. The combination of a leer, a leer conveyor, means for delivering articles to said conveyor, and a wall extending across the leer over the conveyor in position to retain articles in a heap as they are piled up on the conveyor.

9. The combination of a leer, a leer conveyor, and a supporting wall extending across the front of the leer over said conveyor in position to retain in a heap articles delivered to the conveyor.

10. The combination of a leer, a leer conveyor, a supporting wall extending across the front of the leer over said conveyor in position to retain in a heap articles delivered to the conveyor, said wall being upwardly and outwardly inclined, and means to convey articles to the leer and deposit them on said inclined wall.

11. In a device of the class described the combination of a leer conveyer and a conveyer for carying ware to the leer conveyer having differential speeds for piling ware upon the leer conveyor.

12. In a device of the class described the combination of a leer conveyer and a conveyer for carrying ware to the leer conveyer having differential speeds for promiscuously heaping the ware upon the leer conveyer.

13. In a device of the class described the combination of a pair of conveyors for ware and having differential speeds, the faster moving conveyor discharging the ware in a heap upon the slower moving conveyor.

14. In a device of the class described the combination of a pair of conveyors for ware and having differential speeds, the faster moving conveyor discharging the ware in a heap upon the slower moving conveyor, and means for retaining the ware in a heap on the slower moving conveyor.

15. In a device of the class described the combination of a pair of conveyors for ware and having differential speeds, the faster moving conveyor discharging the ware in a heap upon the slower moving conveyor, and means for adjusting the faster moving conveyor to various heights above the slower moving conveyor.

16. In a device of the class described the combination of a pair of conveyors for ware and having differential speeds, the faster moving conveyor discharging the ware in a heap upon the slower moving conveyor, means for retaining the ware in a heap on the slower moving conveyor, and means for adjusting the faster moving conveyor to various heights above the slower moving conveyor.

17. In a device of the class described the combination of a leer, a conveyor exteriorly of the leer extending substantially lengthwise of the leer and at one end thereof, and means for mounting the conveyor for moving the conveyor bodily to and from an operative position at the end of the leer.

18. The combination of a leer, a conveyor for bottles, means for moving the conveyor longitudinally through the leer, a second conveyor located upon the exterior of the leer and adapted to deposit bottles in a pile upon the first conveyor.

Signed at Cincinnati, in the county of Hamilton and State of Ohio, this 14 day of September, 1921.

PERCY Q. WILLIAMS.